(12) United States Patent
Harper

(10) Patent No.: US 7,966,217 B2
(45) Date of Patent: Jun. 21, 2011

(54) METHOD FOR PACKET FACILITATED E-COMMERCE

(76) Inventor: William Harper, Redmond, WA (US)

( * ) Notice: Subject to any disclaimer, the term of this patent is extended or adjusted under 35 U.S.C. 154(b) by 498 days.

(21) Appl. No.: 12/215,015

(22) Filed: Jun. 23, 2008

(65) Prior Publication Data

US 2009/0319358 A1    Dec. 24, 2009

(51) Int. Cl.
*G06Q 30/00* (2006.01)
(52) U.S. Cl. .......................................... 705/14
(58) Field of Classification Search ............... 705/14
See application file for complete search history.

(56) References Cited

U.S. PATENT DOCUMENTS

| | | | |
|---|---|---|---|
| 5,701,694 A * | 12/1997 | Atkinson | 40/493 |
| 6,305,531 B1 * | 10/2001 | Wilkman | 206/210 |
| 6,413,000 B1 * | 7/2002 | Borcherds et al. | 401/118 |
| 6,691,897 B2 * | 2/2004 | Ashe | 222/174 |
| 7,163,101 B2 * | 1/2007 | Harper | 206/210 |
| 7,322,465 B2 * | 1/2008 | Harper | 206/210 |
| 7,782,214 B1 * | 8/2010 | Lynn | 340/573.1 |
| 2002/0011424 A1 * | 1/2002 | Wilkman | 206/210 |
| 2003/0106812 A1 * | 6/2003 | Wilkman | 206/210 |
| 2003/0197026 A1 * | 10/2003 | Ashe | 222/174 |
| 2006/0155600 A1 * | 7/2006 | Mays | 705/14 |
| 2006/0289558 A1 * | 12/2006 | Parker | 221/97 |
| 2008/0193495 A1 * | 8/2008 | Kharazmi | 424/404 |
| 2008/0319918 A1 * | 12/2008 | Forlai | 705/80 |

OTHER PUBLICATIONS

Brody, Jane E, "Clealiness doesn't mean healthfulness", Houston Chronicle. Houston, Tex: Jun 25, 2000. p. 2.*
"99 Places where you need to watch out for germs; Makers of Purell® set out to raise awareness about importance of Everyday Hygeine", PR NewsWire. New York: May 2, 2006. pp. 1-7.*
U.S. Appl. No. 11/365,711, filed Mar. 1, 2007, William A. Harper.

* cited by examiner

*Primary Examiner* — Ella Colbert
*Assistant Examiner* — Mohammad Z Shaikh

(57) ABSTRACT

This invention generally relates to a method for facilitating the purchase of goods and services through access to online websites that populate the World Wide Web. More particularly the method discloses the use of widely distributed resealable packets of liquid that bear website addresses to prompt or facilitate explicit access to websites without use of search engine interfaces. Further, website hosting by the manufacture of the packets coordinates website form and content with packet incentives and database supported website customization.

23 Claims, 2 Drawing Sheets

US 7,966,217 B2

METHOD FOR PACKET FACILITATED E-COMMERCE

RELATED APPLICATION

This patent application is related to another pending patent application Ser. No. 11/365,711 entitled "Resealable Packets of Liquid", filed 1 Mar. 2006, the disclosure of which is incorporated by reference herein. Further, U.S. Pat. No. 7,322,465 entitled "Method of Using Liquid Packets with Advertising Inserts", issued 29 Jan. 2008, is incorporated by reference herein.

FIELD OF THE INVENTION

This invention generally relates to a method for facilitating the purchase of goods and services through exposure to online websites that populate the World Wide. More particularly the method discloses the use of widely distributed resealable packets of liquid that bear website addresses to prompt or facilitate direct access to websites without use of search engine interfaces.

BACKGROUND OF THE INVENTION

By 2007 there were an estimated 110 million distinct websites and some 30 billion web pages on the World Wide Web (web) accessible through the Internet; these numbers continue to grow rapidly with each day. Every website has a unique web address technically known as a Uniform Resource Locator (URL) which appears as a string of routing numbers (e.g., 42.141.58.103). But such strings are difficult to recall so Internet users quickly developed a more mnemonic device known as domain names (e.g., www.example.com); such catchy domain name website addresses have become the public face of the URL so as to ease e-mail correspondence and general access to websites. In the past decade entrepreneurs and other business-oriented individuals discovered and began development of the incredible commercial opportunities residing in Internet accessed websites where barriers to and costs for transacting business are virtually non-existent for the motivated buyer. Once connected, it often becomes only a matter of choice or travel as to what to buy online or at a referred place of business. Entering an e-commerce website has become the virtual equivalent of going into a hardware store or restaurant; rarely does the buyer leave with nothing. This is particularly true if the website engages the buyer on a personal level with incentive or reward offerings in the form of effective, albeit virtual, marketeering. The real challenge facing business owners who have embraced e-commerce is getting the buyer to and through their virtual doorway, to their place of business by way of their web address. Essentially, for the business owner, getting their needle of a website found in the haystack of the web.

Currently, there are two basic approaches used to attract and direct buyers to business websites. First, there are search engines that mine, parse, rank and display web page content by various techniques centered on the key words found therein. Additionally, the search engine helpfully attaches affiliated business sources that may also be of interest based on the nature of the search request. These popular tools employ increasing sophisticated techniques for searches that often return intriguing data and sometimes useful information—Google alone processes more than 200 million searches a day. Yet all too often these category searches miss the mark, particularly when the buyer is searching for small and local business sources. For example, quick and useful results are returned for a nation-wide search for a supplier of 22-gauge sterling silver metal stock and even though located six states away, package delivery negates the distance factor. But a search for a local small Mexican restaurant whose name can not be accurately recalled usually returns nothing of useful value. Often an ill-planned or poorly executed web search returns an overwhelming sea of information that simply swamps anything of value that might be contained within. Even experienced web surfers are becoming discouraged by the time required to shift through the ever expanding volume of misleads resulting from the web's rampant content growth.

A second approach for attracting and directing buyers to a website are the historic advertising techniques where the website replaces the telephone number or street address in conventional advertising media like newspaper ads or direct marketing examples like distributed novelties, package insert programs, and direct mail flyers. Here, in each of these methods, the basic approach is to rely on the proven advertising practice of placing an offering in the hands of a buyer repeatedly or in hopes of striking a timely chord of recency. In the first instance, concerning repeat exposures, it is a tenet of advertising that it takes a minimum of three to nine exposures to an effective message just to capture the attention of the buyer—and more exposures the better, finally limited only by the cost of advertising. In the second instance, recency, the factor of timeliness is paramount; the buyer ready to buy, when presented with an opportune advertising message, will buy the offered product or service. In contrast to search engines, the direct connect model is immediate and unencumbered by misleads, delays and simple obfuscations that often result from searches. Unfortunately, the media costs for direct advertising are rising well beyond affordability; most of advertising supported mediums are severely impacted by the well-known information delivery efficiencies inherent to the Internet and expanding use of the Internet has significant threatened the very existence of many. Local newspapers are but one example dying for a lack of advertising revenue. Direct advertising can be efficient and cost effective, but in an Internet world dominated by search engines providing website access, the current techniques of direct marketing are proving to be ineffectual for e-commerce.

Accordingly, a more effective method than inadequate web searches and relatively costly direct advertising is needed to facilitate e-commerce. The method should be based on an ultra low-cost, widely distributed, ubiquitous advertising tool providing website addresses to facilitate website e-commerce. To control costs the method must supply a separate, widely perceived beneficial need that can mitigate the costs of distribution, be sufficiently flexible in format to permit highly variable incentive marketing, and be sufficiently short-lived in purpose to require frequent replacement to satisfy both frequency and recency factors for effective advertising. Finally, the method must effectively prompt or facilitate access to a website by providing a clear web address whereby a buyer can purchase a product or service as advertised. There is a significant need for such a straightforward access method in the emerging world of small business e-commerce.

SUMMARY OF THE INVENTION

An exemplary embodiment of the invention relates to a method for prompting or facilitating access to a commercial website by widely distributing packets of hand sanitizer that carry a website address to a population of potential buyers. Vendors, particularly small local shop owners, are continually faced with the problem of creating and maintaining interest in their offerings. Websites and e-commerce in general can be very affordable options for even their small advertising budgets but making these sites known to customers, both current and future, has proven to be an insurmountable problem. By distributing low-cost, multi-dose, resealable hand sanitizer packets, a device handled repeatedly in the course of every day, the vendor's name and website will come readily to mind because it has been so readily at hand.

Accessing the website affords the buyer an opportunity to see all offers, special and new, with all their inducements, presented with all the vibrant skill capable with today's websites. Even possession of the packet itself may provide further incentive by bearing, in addition to the website address, an identifier that can provide even additional discounts, awards, and other such persuasions. By combining the sanitizer packets in hand with exposure to the website's fuller dynamic offerings, the vendor has an efficient and effective tool to directly link with their buyers both online or in the shop. And the resealable liquid packages can be used for many other popular liquids commonly distributed. Such useful liquids include sun screen lotions, hand crèmes, beverage flavorings, and insect repellants to name a few. Whatever the liquid, the packet's advertising message directing the buyer explicitly to the vendor's engaging, well-maintained, and interactive website for transacting business is a constant, repetitive and timely presence which promotes packet facilitated e-commerce.

Another key feature of the present invention is an element of the method where the provider that manufactures the packets also creates the form and hosts the website to the vendor's specification as to content. With provider website hosting, coupled with database support derived from packet specifications and website performance data, a full range of marketing techniques are made available to the vendor. A provider furnished website, coupled with manufacturing and supplying resealable packets, offers an enhanced integrated service of significant value to the vendor whose principle goal is a focus on the sale of products and services.

Consequently, a primary object of the present invention to provide a novel and significant advancement in the e-commerce art by utilizing resealable packets of hand sanitizing fluid distributed in a population, each bearing a website address to prompt or facilitate explicit access to this website, whereby a buyer may purchase a product or service advertised therein.

Another object of the present invention is disclosure of a method where the website and its address gain familiarizing recognition leading to access by being associated with a hand sanitizing packet that provides a beneficial use to the population in which it is distributed by reducing the transmission of infectious disease.

Another object of the present invention is disclosure of a method wherein the website is hosted by the provider of the packets so as to develop and maintain standards for website form and content through website transaction data collected by a database.

Another object of the present invention is to provide pinpoint access to a website on the web without engaging a search engine and dealing with the subsequent voluminous response list of competing offers associated with such searches.

Another object of the present invention is to link packet borne incentive marks with website incentives in the form of discount or reward coupons and like marketing techniques.

Another object of the present invention is to record data from website access and associated activity in a database.

A final object of the present invention is to use such data and subsequent information recorded in the database to customize web page content for a buyer based on previous access and transaction behavior.

These and other objects and advantages of the present invention will become apparent from the following description taken in conjunction where appropriate with the accompanying diagrams wherein are set forth, by way of illustrations and example, certain embodiments of this invention. The diagrams constitute a part of this specification and include exemplary embodiments of the present invention and illustrate various objects and features thereof.

BRIEF DESCRIPTION OF THE DRAWINGS

The invention will be better understood and even other objects than those set forth above will become apparent when consideration is given to the following detailed diagrams showing the functional flow for the present invention as contrasted with the prior art.

DETAILED DESCRIPTION OF THE INVENTION

Figure 1:
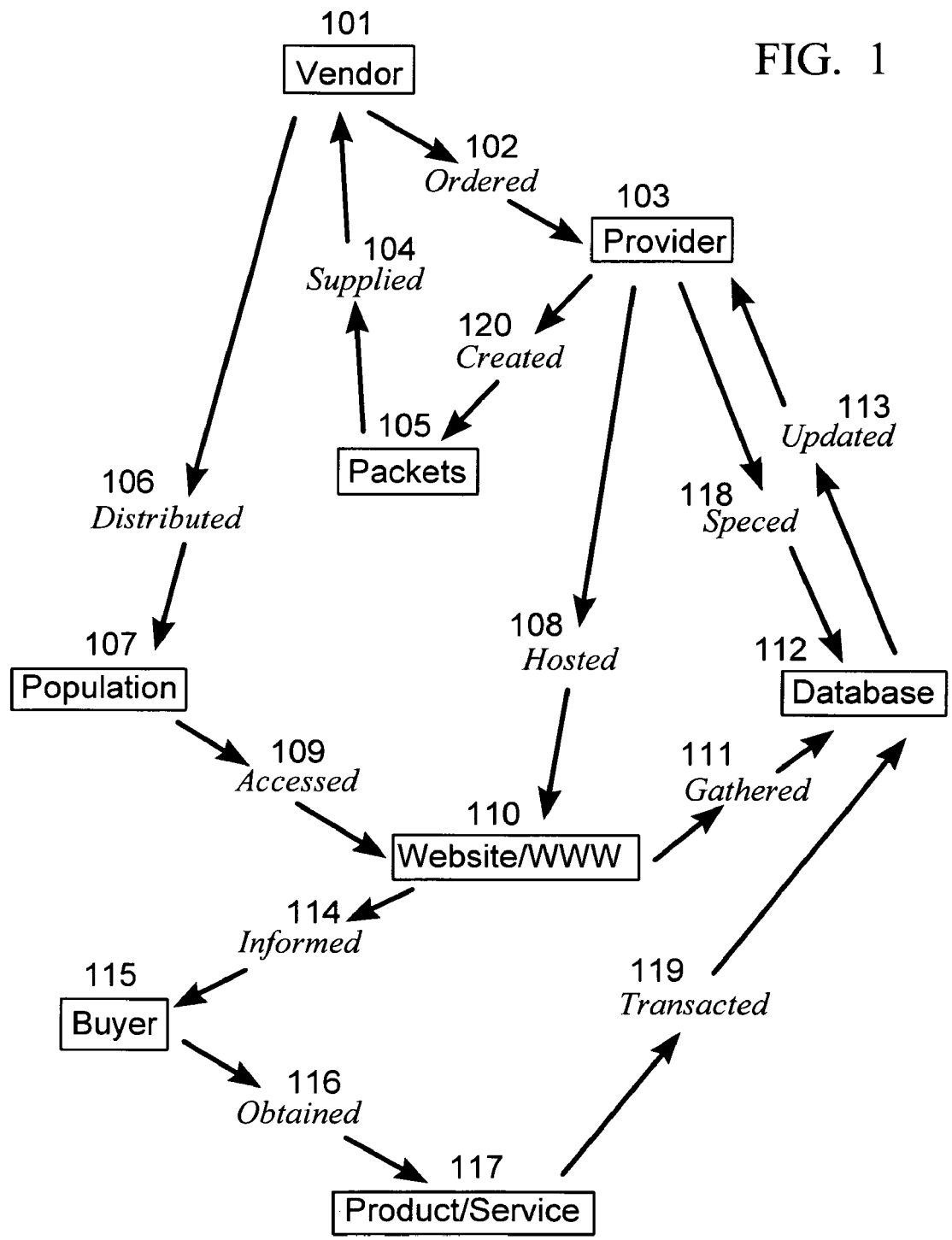
FIG. 1 is a diagram showing the flow of functions between key components wherein liquid packets are manufactured, distributed, and used to facilitate to access a hosted website by a buyer seeking products and services according to the teachings of the present invention.

While the invention will be described in connection with illustrations, descriptions, and an example of a preferred embodiment, it will be understood these are not intended to limit the present invention only to that embodiment. On the contrary, the present invention is to cover all structural and/or functional alternatives as generally described and defined by the appended claims. The following terms are defined to provide clarity to the subsequent discussions and claims The term "hand sanitizing fluid" as used herein refers to any non-irritating, antimicrobial-containing composition in the form of a fluid, gel, spray, foam, cream, lotion, or tincture preparation designed for frequent use that can reduce the number of transient microorganisms, specifically pathogens, when applied to and dispersed over the hands and other skin areas. Such preparations have a broad antimicrobial spectrum, are fast-acting, and often persistent. Representative of such agents are alcohols (e.g. ethyl and isopropyl), iodines (e.g. hexachlorophene), bisbiquanides (e.g. Chlorhexidine digluconate), and quaternary ammonium salts (e.g. Benzalkonium chloride) which are formulated singularly or in combination. This term is specifically intended to include all such preparations, known and unknown, that are capable of achieving a substantial reduction of skin resident pathogens when applied to the hands or other areas of human skin where such pathogens are found.

The term "resealable packet" as used herein refers to a packet constructed with any polymer film capable of being constructed into a packet packaging form of two principle sidewalls joined at the edges for containment and preservation of a useful liquid. Such polymer films as may prove useful for this purpose have sufficient flexibility to yield to finger pressure, are sufficiently durable to withstand reasonable hydraulic pressure created by fingers, have good crack and puncture resistance, have very good chemical resistance and low gas permeability, and are capable of being sealed to self or other materials. Representatives of single formulation films are polypropylene and polyethylene. Numerous grades, gauges, clarities, colors, textures, manifold laminations of diverse films and foils, formed by many techniques, with numerous properties and qualities, resulting from an even greater numbers of formulations, provide a wide array of polymeric materials to select from, singularly or in combination, to satisfy the specific chemical, physical, and aesthetic attributes required for a specific packet's construction, its content's formulation, and the precise function for which it is intended. In any circumstance where food or drug contact with a polymer material occurs, U.S. FDA approved food grade polymeric material are recommended. The term "resealable packages" is used to describe a more general form of resealable liquid containers than packets but incorporate the same general characteristics not specifically dictated by the packet form. All known and yet unknown polymer materials functionally suited for use in constructing resealable packets and packages containing useful liquids are envisioned by use of these terms.

The term "useful liquid" as used herein refers to any substance with the capacity to demonstrate fluidity. Specifically, liquids are described by many forms that include but are not limited to mixtures of homogeneous and non-homogeneous substances, solutions, suspensions, colloids, sols, and similar terms. "Useful" connotes a utility aspect for employing the dispensed liquids characterized by common products, forms, and categories such as additives, adhesives, aftershaves, alcohol solutions, antibiotic ointments, antifungal cream, anti-itch creams, antimicrobial fluids, antiseptic creams, baby formulas, bandages, bath oils, beverages, bleaches, body oils, body washes, breath fresheners, butters, candies, cleaner oils, cleaners, coffee extracts, colognes, colorants, condiments, conditioners, creamers, creams, dairy products, decongestants, deodorants, disinfectants, drinks, edible oils, emulsions, essential oils, eye drops, eye lubricants, fabric conditioners, fabric softeners, fertilizers, flavorings, foods, fragrances, fruit jellies, fruit spreads, fuel treatments, gels, glass cleaners, gravies, greases, hair treatments, hairdressings, hand sanitizers, hand soaps, herbal extracts, honeys, insect repellants, jams, liniments, lip balms, lotions, makeup fluids, margarines, marmalades, medications, mineral solutions, moisturizers, mouthwashes, nectars, oils, ointments, paints, pastes, perfumes, petroleum jellies, polishes, preserves, salad dressings, salsas, sauces, seasonings, shampoos, skin crèmes, skin lotions, skin moisturizers, skin toners, soaps, soups, spices, spreads, stain removers, styling creams, styling gels, sugar solutions, sun screens, sweeteners, syrups, tea extracts, toothpaste, vegetable milks, vegetable oils, vinegars, vitamin solutions, waxes, and similar items, descriptions, and functions. This utility quality of the liquid distinguishes "useful liquids" as defined herein from liquids that are never intended for disbursement from their containers such as those found in gel filled mouse pads and like novelties.

Figure 2:
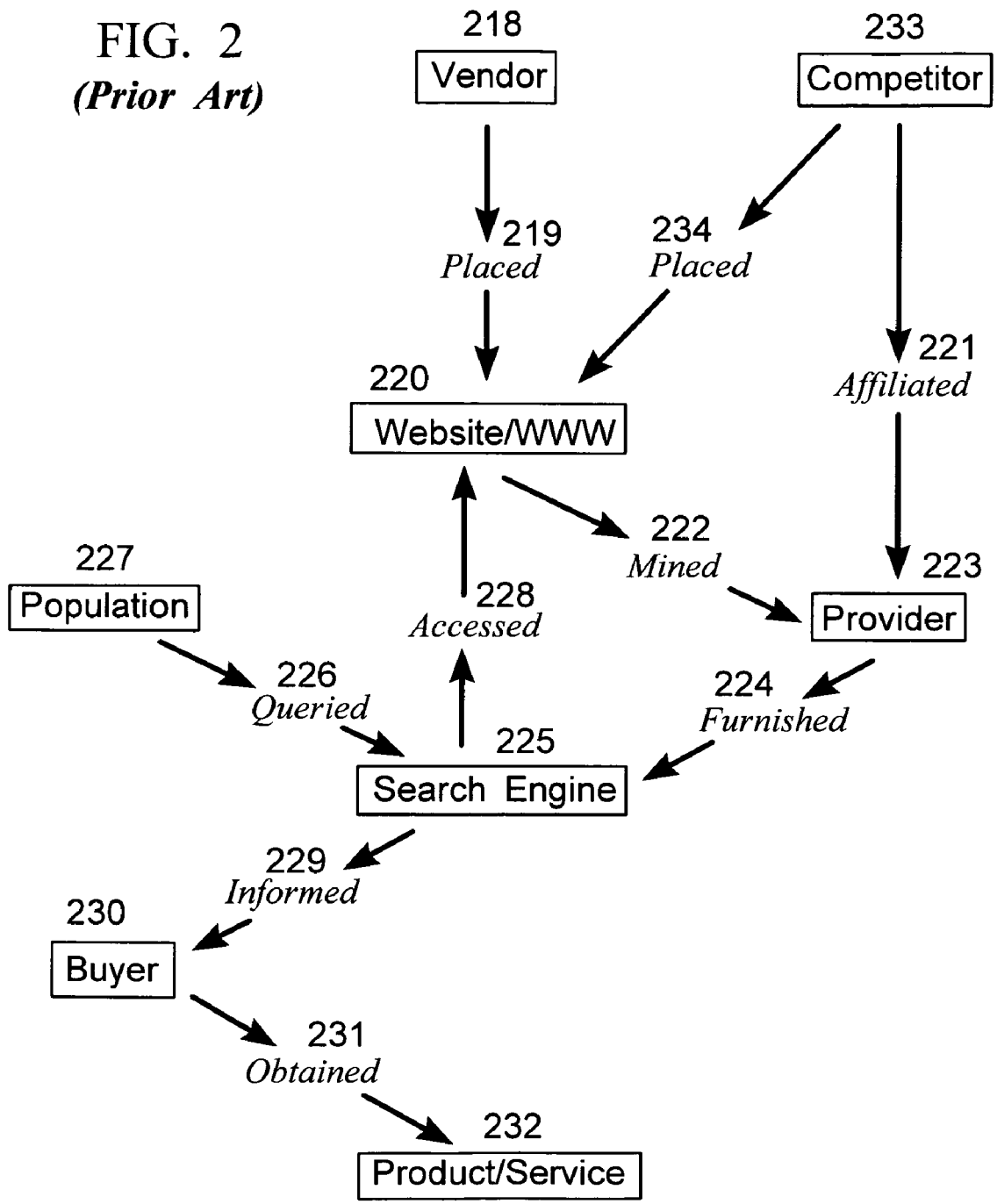
FIG. 2 is a diagram showing the prior art wherein a search engine provides buyer access to a website.

FIG. 1 provides a diagram showing direct marketing access to a website, this schema is the subject of the present invention. To better understand this description it is useful to first review how it differs from the prior art. This can be accomplished by a quick walkthrough of FIG. 2 where a diagram shows the steps followed when a search engine is involved in assisting a buyer in locating a vendor's website with the intent of conducting a transaction. In FIG. 2 (Prior Art) the diagram shows the vendor 218 has no explicit or direct influence on anyone in the general population 227 to come to their specific website 220. Website access 228 is typically through a categorical query 226, such as restaurants in a city, given to a search engine 225 that in turn accesses 228 the World Wide Web 220 which is mined 222 for all relevant web page content on the web 220 and the results returned to the search engine 225 provider 223 which formats and enhances the results which are then furnished 224 to the search engine 225 to inform 229 the querying buyer 230. The buyer 230, in order to become a purchaser, must then further explore a lengthy list 229 of possibilities (essentially a display of the vendor's 218 competitors 233) from which to obtain 231 a product or service 232. Not only is the vendor's advertising message, the placed 219 website 220, lost in the proverbial haystack extracted 222 from the web 220 by the search engine 225, the very haystack itself is made up of the competitor's 233 offerings 234 as well—each and every entry representing a lost sale. Further, the search engine 225 provider 223 adds to the furnished 224 list 229 prominently displayed affiliated 221 competitors 233 that pay for conspicuous display in the list 229 to compete with the vendor 218 for offered 231 sales. The deck is literally stacked against a given vendor 218 making a sale 231. With the prior art, many vendors 218 have found that any portion of their advertising budget invested 219 in a website 220 simply provides too poor a return for the time and resources required. The present invention diagrammed in FIG. 1 shows how direct marketing tied into specific access to a website markedly improves the vendor's probability of a sale by establishing a non-competitive environment in which to conduct e-commerce. Every advertising dollar spent is used to secure an interference-free sale.

In FIG. 1 the diagram shows the vendor 101 ordering 102 from a manufacturing provider 103 a number of resealable packets 105 of hand sanitizing fluid. Once these packets are created 120 and shipped 104 they are distributed 106 by the vendor 101 in a population 107 containing at least one potential buyer 115. Carried by the packets 105 is the website 110 address of the vendor 101. The presence and use of the packets 105 displaying the vendor's 101 web address facilitates or prompts at least one member of the population 107 to access 109 the vendor's 101 web address which, when informed 114, creates a buyer 115. The access 109 has not returned a list of possible choices as would a category query to a search engine, but the specific website 110 that the vendor 101 ordered 102 from the provider 103 to host 108 on the web 110 when the packets 105 where ordered 102. Additionally, at that time, the order 102 specifications 118 were also entered in a database 112 for use in interactive processing and maintenance updated 113 through hosting 108 by the provider 103 of the website 110. This activity includes data gathering 111 from access 109 and transaction data 119 from any sales 117 activity, all of which is passed for inclusion in the database 112. The buyer 115, engaged with and informed 114 by advertisements on the website 110 is now able to obtain 116 through purchasing the product and services 117 of the vendor 101 online or at a referred shop facility without disruptive competitive distractions. By direct buyer access derived from the packet's web address, every e-commerce advertising dollar spent is used to secure an interference-free sale for the vendor.

A significant element for establishing and maintaining the relationship between the packets 105 and the website 110 is the database 112. As noted the database 112 records are first established with the vendor 101 order 102 to the provider 103 where the specifications 118 are recorded. Additional data elements are created when select individuals from the general population 107, prompted or facilitated by a packet 105 web address, access 109 the website 110 and provide a name, identification code, email address or similar means of contact as part of the accession 109 process which provides website 110 information 114 to the buyer 115. Each buyer 115 accession 109 of the website 110 adds at least one data element to the database 112. This gathered 111 data retrieved and manipulated as update 113 information for the provider 103 results, when combined with other data, in the ability of the provider 103 to evaluate aspects of buyer and enterprise behavior to enhance the buyer's website 110 experience.

Key to providing an enhanced buyer 115 experience when working with the vendor's 101 website 110 is the hosting 108 of that website 110 by the provider 103. The provider's 103 hosting 108, initiated by the vendor's 101 order 102 for packets 105, may also create and furnish elements of the website's 110 form and content derived from that action. By hosting 108 the website 110 the provider 103 is able to coordinate any incentive offers carried by the distributed 106 packets 105 with the website 110 and maintain buyer 115 customized treatment within the website 110 based on previously recorded and evaluated aspects of buyer and enterprise behavior obtained from the database 112. The provider 103 works closely and continuously with the vendor 101, for example, in establishing and maintaining the hosted 108 website 110. After the initial format of the website is selected by the vendor 101, much of the responsibility for changing content flows to the vendor 101 who can best coordinate packet 105 distribution and website 110 changes; other basic techniques such as a personalized name salutation welcoming the returning buyer would be the responsibility of the provider 103 hosting 108 the website 110. Provider 103 hosting 108 of the website 110 presents a seamless integrated experience for the buyer 115 and numerous operational marketing advantages for the vendor 101.

Various incentives are also a part of the method of the present invention. They may be found incorporated with the distributed 106 packets 105 which can carry incentive marks. These marks may be unique serial numbers, group designations, the symbols of a poker hand, simply a word or phrase, or any number of such examples. These marks may be openly displayed on the packet 105, borne inside on inserts, hidden by folded inserts, or even spread across several packets 105 which must be combined to be complete, but once whole can be used with the website 110 to obtain discounts, favorable scheduling, upgrades, coupons, or all and any such tools of incentive marketing the vendor 101 may chose to offer. Likewise, the incentive may be initiated by customized treatment of a buyer 115 based simply on access 109 of the website 110 typically flowing from previous encounters recorded in the database 112. Incentive offers through the vendor's 101 website 110 provide an opportunity for obtaining 116 more sales of products and services 117.

A useful liquid has been defined as a large number of fluid products and types capable of being placed in packets or packages. The intent is to identify any liquid that would find acceptance when distributed in a target population containing at least one buyer capable of purchasing a product or service. And while the packet form with hand sanitizing fluid, also both previously defined, is the preferred embodiment of the method, a more generalized form of packaging in packages is equally envisioned for any container capable of holding a liquid and resealable to permit multi-dose dispersal.

It is to be understood that even though numerous characteristics and advantages of the present invention have been set forth in the foregoing description, together with details of the structure, function, and employment of the invention, the disclosures are illustrative only, and changes may be made in details, especially in matters of shape, size, and arrangement of the parts together with content and materials and form utilized, within the principles of the invention to the full extent indicated by the broad general meaning of the terms are expressed. In particular, the foregoing specification and embodiments are intended to be illustrative and are not to be taken as limiting. Thus, alternatives, such as functional equivalents, and other such modifications will become apparent to those skilled in the art upon reading the foregoing description.

What is claimed is:

1. A method for purchasing a product or service, comprising the steps of: distributing a plurality of resealable packets of hand sanitizing fluid containing at least one insert into a population to reduce the transmission of infectious disease in said population that includes at least one buyer capable of purchasing a product or service; accessing a packet provider hosted website by a buyer possessing at least one of said packets which bears at least one website address which prompts or facilitates such access; and, purchasing by said buyer of at least one product or service advertised on said website.

2. The method of claim 1 wherein said packet provider creates and furnishes said hosted website with form and content derived from vendor order of said packets.

3. The method of claim 1 wherein said product or service is purchased from a facility referred to by the website.

4. The method of claim 1 wherein said product or service is purchased online through website processing.

5. The method of claim 1 further comprising the step of obtaining from said buyer at least a name, identification code or email address when accessing said website.

6. The method of claim 5 wherein such access to a website generates customized web page content for said buyer based on previous access and buying behavior.

7. The method of claim 1 further comprising the step of the said packets bearing at least one incentive mark.

8. The method of claim 7 wherein said website offers incentives to purchase said advertised product or services, said incentive offerings initiated by said customer providing said packet incentive mark for website processing.

9. The method of claim 8 wherein said website incentives are in the form of discount or reward coupons.

10. The method of claim 1 wherein said buyer access of a website creates at least one data element in a database.

11. The method of claim 10 wherein said data element is combined with other data to evaluate aspects of buyer and enterprise behavior.

12. A method for purchasing a product or service, comprising the steps of: distributing a plurality of resealable packets of useful liquid containing at least one insert into a population with the intent of placing said packets with at least one buyer within said population capable of purchasing a product or service accessing a packet provider hosted website by a buyer possessing at least one of said packets which bears at least one website address which prompts or facilitates such access; and, purchasing by said buyer of at least one product or service advertised on said website.

13. The method of claim 12 wherein said packet provider creates and furnishes said hosted website with form and content derived from vendor order of said packets.

14. The method of claim 12 wherein said product or service is purchased from a facility as referred by the website.

15. The method of claim 12 wherein said product or service is purchased online through website processing.

16. The method of claim 12 further comprising the step of the said packets bearing at least one incentive mark.

17. The method of claim 12 wherein said buyer access of a website creates at least one data element in a database.

18. The method of claim 12 further comprising the step of obtaining from said buyer at least a name, identification code or email address when accessing said website.

19. The method of claim 18 wherein such access to a website generates customized web page content for said buyer based on previous access and buying behavior.

20. A method for purchasing a product or service, comprising the steps of: distributing a number of resealable packages of useful liquid containing at least one insert, each bearing at least a website address, amongst a population that includes at least one buyer capable of purchasing a product or service; accessing a website by a buyer possessing at least one of said packets which provides said website address thus prompting or facilitating the access; and, considering for purchase by said buyer at least one product or service advertised on said website.

21. The method of claim 20 further comprising the step of the provider of said packets hosting said website accessed by said website address.

22. The method of claim 20, wherein said product or service is purchased from a facility referred to by the website.

23. The method of claim 20, wherein said website offers incentives to purchase said advertised product or services, said incentive offerings initiated by said customer providing said packet incentive mark for website processing.

* * * * *